United States Patent
Boon et al.

(10) Patent No.: US 11,775,684 B2
(45) Date of Patent: *Oct. 3, 2023

(54) RULE-BASED DOCUMENT SCRUBBING OF SENSITIVE DATA

(71) Applicant: MICROSOFT TECHNOLOGY LICENSING, LLC., Redmond, WA (US)

(72) Inventors: Brian Boon, Redmond, WA (US); Dinesh Chandnani, Sammamish, WA (US); Zhu Chen, Redmond, WA (US); Ram Kumar Donthula, Redmond, WA (US); Matthew Sloan Theodore Evans, Kindred, ND (US); Andrew Neil, Seattle, WA (US); Vijaya Upadya, Sammamish, WA (US); Geoffrey Staneff, Woodinville, WA (US); Shibani Basava, Seattle, WA (US); Evgenia Steshenko, Seattle, WA (US); Carl Brochu, Renton, WA (US); Shaun Miller, Sammamish, WA (US); Xin Shi, Kirkland, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/888,908

(22) Filed: Aug. 16, 2022

(65) Prior Publication Data

US 2022/0391538 A1 Dec. 8, 2022

Related U.S. Application Data

(63) Continuation of application No. 16/408,143, filed on May 9, 2019, now Pat. No. 11,449,635.

(Continued)

(51) Int. Cl.
*G06F 21/62* (2013.01)
*H04L 9/06* (2006.01)
(Continued)

(52) U.S. Cl.
CPC ...... *G06F 21/6254* (2013.01); *G06F 21/6245* (2013.01); *H04L 9/0643* (2013.01); *H04L 63/0421* (2013.01); *G06F 21/602* (2013.01)

(58) Field of Classification Search
CPC ............ G06F 21/6254; G06F 21/6245; G06F 21/602; H04L 9/0643; H04L 63/0421
See application file for complete search history.

(56) References Cited

U.S. PATENT DOCUMENTS 9,740,876 B1 * 8/2017 Nachenberg .......... G06F 21/554
9,846,716 B1 * 12/2017 Scott ................... G06F 16/2365
(Continued)

OTHER PUBLICATIONS

"Office Action Issued in European Patent Application No. 19727796.5", dated May 3, 2023, 4 Pages.

*Primary Examiner* — Cheng-Feng Huang

(57) ABSTRACT

A rule-based attribution mechanism analyzes documents having different types of data in different formats through the application of script-based rules that apply a tag to the document identifying the type of sensitive data that is contained in the document. Documents having similar tags are aggregated so that the sensitive data is scrubbed from the document leaving the telemetric data available for downstream processing. The scrubbing entails different actions, such as, eliminating the sensitive data, obfuscating the sensitive data, and converting the sensitive data into a non-sensitive value.

15 Claims, 10 Drawing Sheets

Related U.S. Application Data

(60) Provisional application No. 62/672,071, filed on May 16, 2018.

(51) Int. Cl.
 *H04L 9/40* (2022.01)
 *G06F 21/60* (2013.01)

(56) References Cited

U.S. PATENT DOCUMENTS

| | | | |
|---|---|---|---|
| 9,953,095 B1* | 4/2018 | Scott | G06F 21/6254 |
| 10,963,590 B1* | 3/2021 | Dash | G06F 21/604 |
| 2005/0138110 A1* | 6/2005 | Redlich | G06F 21/6254 |
| | | | 709/201 |
| 2010/0042583 A1* | 2/2010 | Gervais | G06Q 40/08 |
| | | | 707/E17.014 |
| 2012/0266250 A1* | 10/2012 | Uhl | G06F 21/6254 |
| | | | 726/26 |
| 2015/0373039 A1* | 12/2015 | Wang | H04L 63/1425 |
| | | | 726/23 |
| 2016/0203336 A1* | 7/2016 | Nambiar | G06F 21/6254 |
| | | | 726/26 |
| 2016/0224803 A1* | 8/2016 | Frank | G06F 21/6245 |
| 2016/0306999 A1* | 10/2016 | Beinhauer | G06F 21/6254 |
| 2016/0378999 A1* | 12/2016 | Panchapakesan | G06F 21/6254 |
| | | | 726/26 |
| 2017/0154021 A1* | 6/2017 | Vidhani | G06V 30/416 |
| 2019/0332807 A1* | 10/2019 | LaFever | G06F 21/6254 |

* cited by examiner

FIG. 7

```xml
<EventDefinition>
  <EventName>vs/core/sessionstart</EventName>
  <EventField>EventName</EventField>
  <Rules>
    <RuleDefinition>
      <Tags>
        <Tag Key="SessionStart" Type="Tag">
          <Value>True</Value>
        </Tag>
      </Tags>
      <Conditions>
        <ConditionDefinition>
          <PropertyName></PropertyName>
          <PropertyType>Property</PropertyType>
          <OperatorType>Equal</OperatorType>
          <ExpectedValue></ExpectedValue>
        </ConditionDefinition>
      </Conditions>
    </RuleDefinition>
  </Rules>
</EventDefinition>
```
702 / 708 / 710 — 700

```xml
<EventDefinition>
  <EventName>xs/core/sessionstart</EventName>
  <EventField>EventName</EventField>
  <Rules>
    <RuleDefinition>
      <Tags>
        <Tag Key="SessionStart" Type="Tag">
          <Value>True</Value>
        </Tag>
      </Tags>
      <Conditions>
        <ConditionDefinition>
          <PropertyName>context.default.xs.core.exename</PropertyName>
          <PropertyType>Property</PropertyType>
          <OperatorType>Equal</OperatorType>
          <ExpectedValue>Studio.app</ExpectedValue>
        </ConditionDefinition>
      </Conditions>
    </RuleDefinition>
  </Rules>
</EventDefinition>
```
704 / 712 / 714 / 716

```xml
<EventDefinition>
  <EventName>context/create</EventName>
  <EventField>EventName</EventField>
  <Rules>
    <RuleDefinition>
      <Tags>
        <Tag Key="SessionStart" Type="Tag">
          <Value>True</Value>
        </Tag>
      </Tags>
      <Conditions>
        <ConditionDefinition>
          <PropertyName>reserved.contextname</PropertyName>
          <PropertyType>Property</PropertyType>
          <OperatorType>Equal</OperatorType>
          <ExpectedValue>Default</ExpectedValue>
        </ConditionDefinition>
        <ConditionDefinition>
          <PropertyName>context.default.xs.core.os.productname</PropertyName>
          <PropertyType>Property</PropertyType>
          <OperatorType>Equal</OperatorType>
          <ExpectedValue>macOS</ExpectedValue>
        </ConditionDefinition>
      </Conditions>
    </RuleDefinition>
  </Rules>
</EventDefinition>
```
706 / 718 / 720 / 722 / 724

HOMOGENIZE DOCUMENTS — 726

RULE-BASED DOCUMENT SCRUBBING OF SENSITIVE DATA

CROSS-REFERENCE TO RELATED APPLICATIONS

This is a continuation of U.S. Pat. No. 11,449,635 filed on May 9, 2019, entitled "RULE-BASED DOCUMENT SCRUBBING OF SENSITIVE DATA", which claims the benefit of U.S. Provisional Application having Ser. No. 62/672,071 filed on May 16, 2018, each of which are incorporated by reference herein in its entirety.

BACKGROUND

Telemetry is the automated recording and transmission of measurement data from remote points. Telemetry is often used in software products to study the user's engagement with the product in a real-world environment. The telemetric data offers valuable insights into the features most frequently used by a user, how often a user uses the product, the settings and options most frequently selected by a user, how often crashes occur with the product, the context of the crashes, bugs and problems a user has with the product, and the overall performance of the product. In essence, the telemetric data gives a developer insight into how the software product is working out in a real-world environment. However, the telemetric data may occasionally include sensitive information not relevant to the performance of the software product.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A rule-based attribution technique is used to scrub sensitive data from a document including telemetry data. The rule-based attribution technique analyzes documents having different types of data in different formats through the application of script-based rules that apply a tag to the document identifying the type of personal data that is contained in the document. Documents having similar tags are aggregated so that the identified personal data is scrubbed in a similar manner leaving the telemetric data available for downstream processing. The scrubbing entails different actions, such as, eliminating the sensitive data, obfuscating the sensitive data, and converting the personal data into a general format.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 7 is a schematic diagram illustrating exemplary rules to homogenize event data generated from three different products having different event formats.

DETAILED DESCRIPTION

Overview

Telemetric data is generated upon the occurrence of different events at different times during a user's engagement with a software product. In order to gain insight into a particular issue with the software product, several different pieces of the telemetric data from different sources may need to be analyzed in order to understand the cause and effect of an issue. The telemetric data may exist in various documents which may be formatted differently containing different fields and properties making it challenging to pull together all the data from a document that is needed to understand an issue. In some instances, the telemetric data may include sensitive data that needs to be protected against unwarranted disclosure. The sensitive data may be any type of information, such as without limitation, confidential data and/or personal data.

In order to overcome this obstacle, the subject matter disclosed herein uses a rule-based attribution technique to identify the sensitive data in a document that may need to be filtered, eliminated or scrubbed so that the underlying telemetric data is preserved for downstream processing. The rules account for the different types of documents in which the telemetric data resides and the different fields and/or properties in which the data resides in a document.

In one aspect, the rule-based attribution mechanism may be used to determine whether or not personal data is present in telemetric data. The rule-based attribution mechanism analyzes documents having different types of data in different formats through the application of script-based rules that apply a tag to the document identifying the type of personal data that is contained in the document. Documents having similar tags are aggregated so that the identified personal data is scrubbed leaving the telemetric data available for downstream processing. The scrubbing entails different actions, such as, eliminating the sensitive data, obfuscating the sensitive data, and converting the personal data into a general or non-personal value.

Attention now turns to a further discussion of the system, devices, components, and methods utilized in a system for scrubbing personal data.

System

Figure 1:
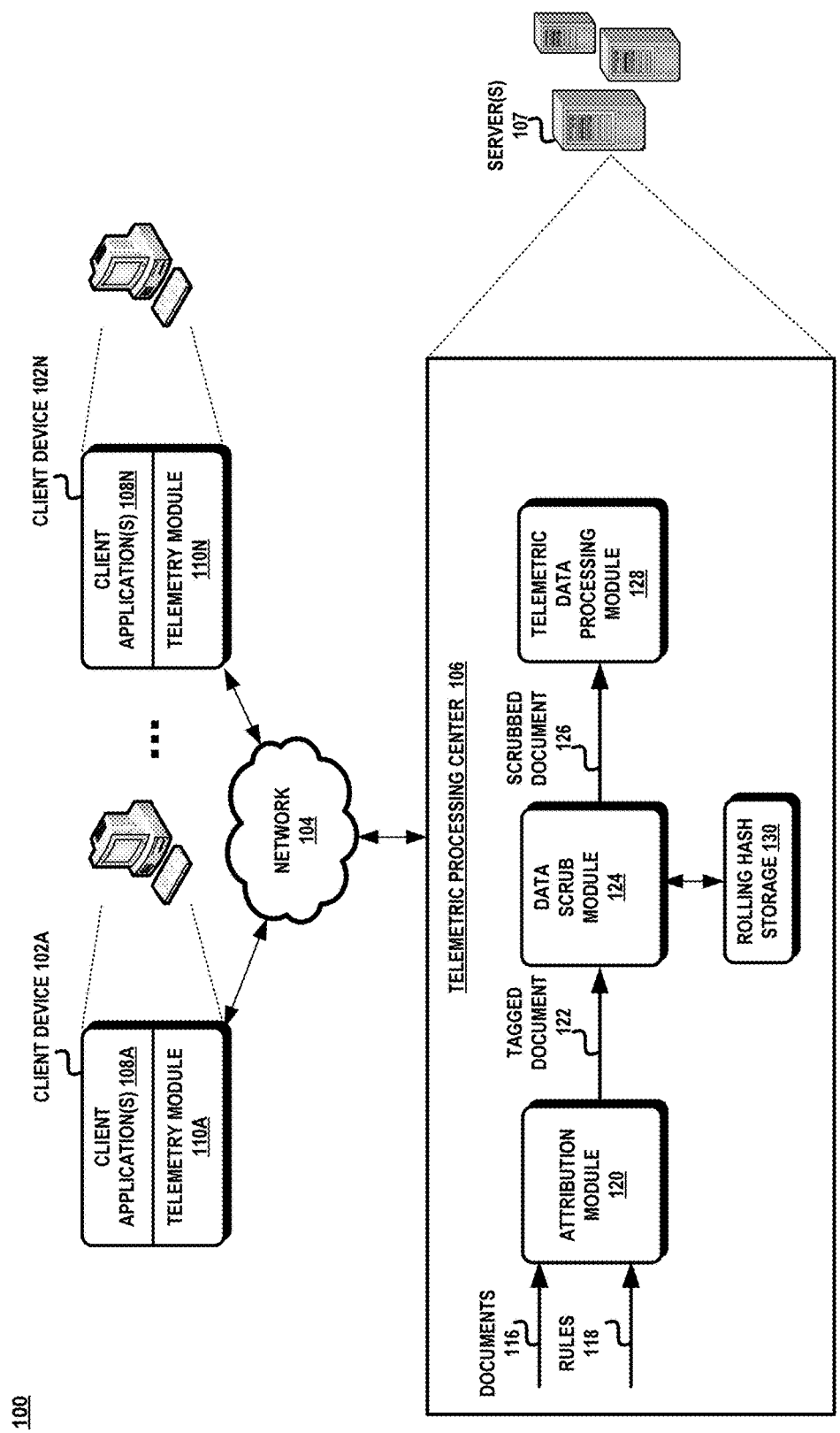
FIG. 1 illustrates an exemplary system performing rule-based document scrubbing of sensitive data.

FIG. 1 illustrates a block diagram of an exemplary system 100 in which various aspects of the invention may be practiced. As shown in FIG. 1, system 100 includes one or more client devices 102A-102N ("102") communicatively coupled through a network 104 to a telemetric processing center 106.

A client device 102 may include one or more client applications 108A-108N ("108") and a telemetry module 110A-110N ("110"). A client application 108 is a software program that executes in a client device 102. There may be multiple client applications 108 in a client device 102. The client application 108 is coupled to a telemetry module 110. The telemetry module 110 may be part of the client application 108 or coupled to the client application 108 as an add-in, extension, plug-in, or the like. The telemetry module 110 generates telemetric data from the execution of a client application 108. The telemetric data may be generated upon the occurrence of certain events.

The occurrence of an event causes event data to be generated. The event may occur from actions that are performed by an operating system based on a user's interaction with the operating system or resulting from a user's interaction with an application executing under the operating system (e.g., user inputs, button clicks, installation of components or plug-ins, uninstallation of components, etc.). Event data may include system-generated logs generated by a resource, such as a software product, to fix problems and improve the quality of the product. Event data may include data from crashes, hangs, user interface unresponsiveness, high CPU usage, high memory usage, and the like. Event data may include memory dumps, stack traces, and exception information. When the event occurs, the event data is encapsulated into a document and transmitted to the telemetric processing center 106. The document may include sensitive data.

The telemetric processing center 106 may be composed of multiple servers 107 and includes an attribution module 120, a data scrub module 124, a telemetric data processing module 128, and rolling hash storage 130. The attribution module 120 receives the documents 116 generated from the telemetry modules 110 and a set of rules 118. The rules 118 indicate a property or field in a document that is under consideration as sensitive data within the various documents, the conditions in which the property/field becomes sensitive data, and the tag that is applied to the document. The attribution module 120 identifies the sensitive data defined by the rules 118 in each document 116 and attributes the document with an appropriate tag.

The tagged document 122 is then processed by the data scrub module 124 which scrubs the sensitive data in an appropriate manner. The data scrub module 124 may delete the sensitive data, convert the sensitive data into a general form or obfuscate the sensitive data. The obfuscation may utilize a simple hashing technique or a more complex hashing technique referred to as a rolling hash. The rolling hash technique utilizes the rolling hash storage 130. A scrubbed document 126 is generated that may be used by a telemetric data processing module 128. The sensitive data does not exist in the scrubbed document 126. The telemetric data processing module 128 analyzes the telemetric data without the sensitive data being embedded therein.

The client devices 102 and the servers 107 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, Internet Of Things (IOT) device, multiprocessor systems, or combination thereof. The network 104 may be any type of communications link capable of facilitating communications between the client devices 102 and the servers 107, utilizing any communications protocol and in any configuration, such as without limitation, a wired network, wireless network, or combination thereof. It will be appreciated that the network connections shown are exemplary and other means of establishing a communications link between the client devices 102 and the servers 107 may be used as well.

The client applications 108, the telemetry modules 110, the attribution module 120, the data scrub module 124, and the telemetric data processing module 128 may be a sequence of computer program instructions, that when executed by a processor, causes the processor to perform methods and/or operations in accordance with a prescribed task. The client applications 108, the telemetry modules 110, the attribution module 120, the data scrub module 124, and the telemetric data processing module 128 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

FIGS. 2A-2D illustrate exemplary rules. In one aspect, the rules may be implemented as a script file written in a markup language or object notation scripting programming language (e.g., XML, JSON, etc.). The rules are applied to each document and the document is modified based on the tag applied to the document. A rule consists of tags and conditions. A tag identifies the attribute applied to the document which is used to identify the subsequent scrubbing action that is performed to the sensitive data in the document. The conditions indicate the circumstances in which the tag is applied. Thus, a rule is composed of a combination of tags to be applied to a document and the conditions under which the rules are applied.

The rules shown in FIGS. 2A-2D have a common format. The rules contain tags and conditions upon which the tag is generated. The rules are associated with a particular event identified by an event name and event field. The event name may represent the name of an event which coincides with the name of the document. There may be several rules applied to a single document. Although each rule is shown as a separate file, several rules may be contained in a single file. It should be noted that the format of the rules shown in FIGS. 2A-2D is exemplary and should not be construed as limiting the disclosure.

Figure 2A:
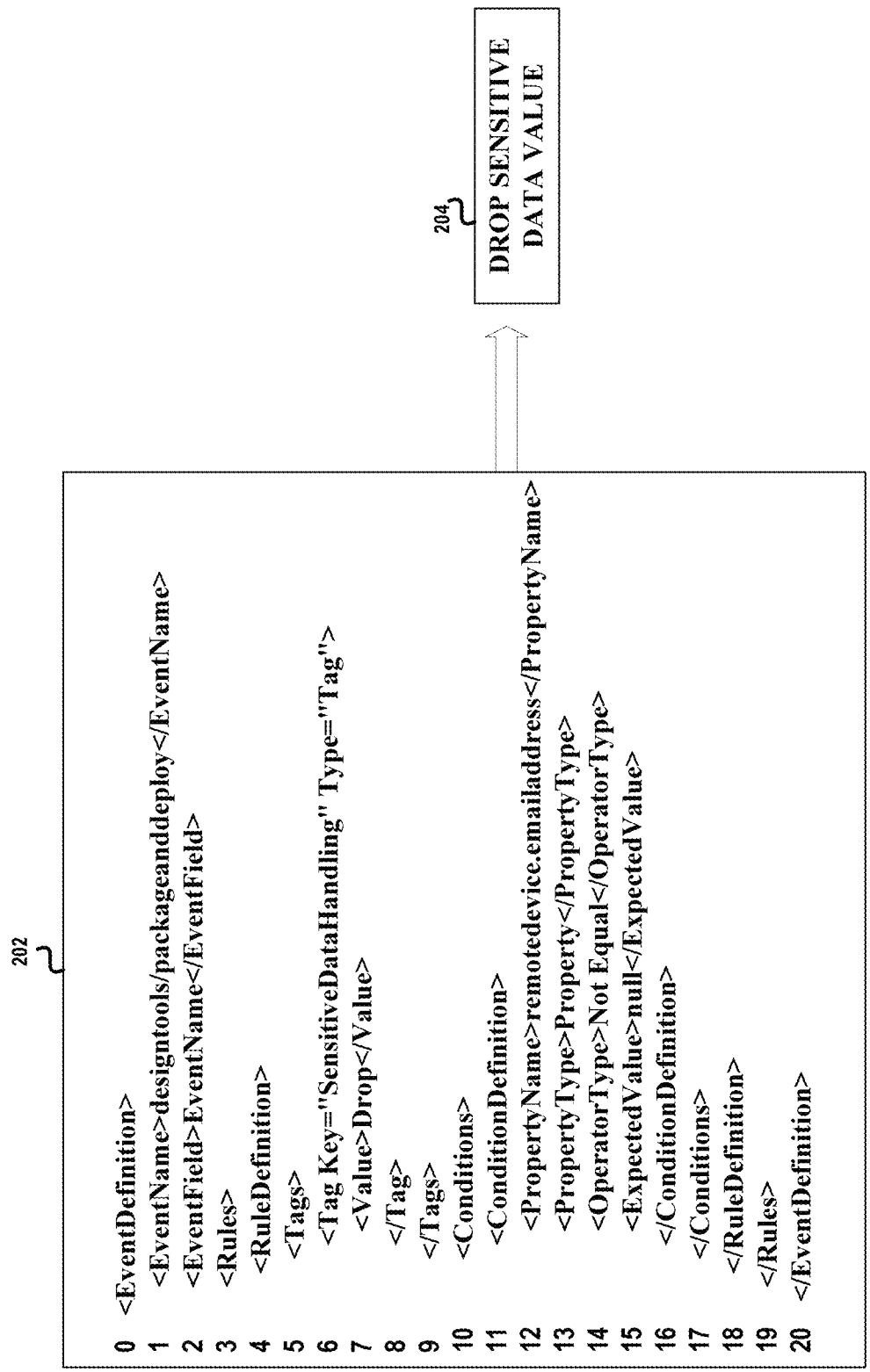
FIGS. 2A-2D are schematic diagrams illustrating examples of the rule-based document scrubbing.

FIG. 2A represents exemplary rules 202 that tag an email address in a document with an attribute that indicates that the email address is to be dropped from the document. Line 0 defines the event definition which spans lines 0-20. Line 1 defines the event name which is designtools/packageanddeploy. Line 2 defines the event field that the rules are applied to, EventName. The rules are composed of tags, lines 5-9 and conditions, lines 10-17. The tag key in line 6 defines the type of the tag which in this example is SensitiveDataHandling. The value, line 7, that is applied to the tag is Drop indicating that the identified sensitive data is to be dropped or deleted from the document. The condition, lines 10-17 identifies that the property in the document, remotedevice.emailaddress, is to be tagged when remotedevice.emailaddress does not have a null value. The remotedevice.emailaddress is then dropped from the document 204 by the data scrub module 124.

It should be noted that the Drop tag may be applied to other fields in a document. For example, the Drop tag may be applied to a machine name, a user name, and a personal name (e.g., Mary Smith).

Figure 2B:

FIG. 2B represents exemplary rules 206 that indicate that a simple hash is to be applied to a project identifier in a document. The project identifier is a unique identifier of a project that is used with an integrated development environment (IDE). Lines 21-41 define the event definition. Line 22 defines the document name which is workspace/search. Line 23 defines the event field that the rules are applied to, EventName. The rules are composed of tags, lines 26-30 and conditions, lines 31-38. The tag key, line 27 defines the type of the tag which in this example is SensitiveDataHandling. The value, line 28, that is applied to the tag is SimpleHash indicating that the identified sensitive data in the document is to be obfuscated with a simple hash value. The conditions, lines 31-38 identify that the property in the document, project.id, is to be tagged when project.id does not have a null value. The project.id is obfuscated using a simple hash technique and the data scrub module 124 replaces the project.id with a hashed value 208.

It should be noted that the SimpleHash tag may be applied to other fields in a document. For example, the SimpleHash tag may be applied to a correlation identifier. A correlation identifier, otherwise referred to as a transit identifier, is a unique identifier that is applied to requests and messages that provide reference to a particular transaction or chain of events.

Figure 2C:
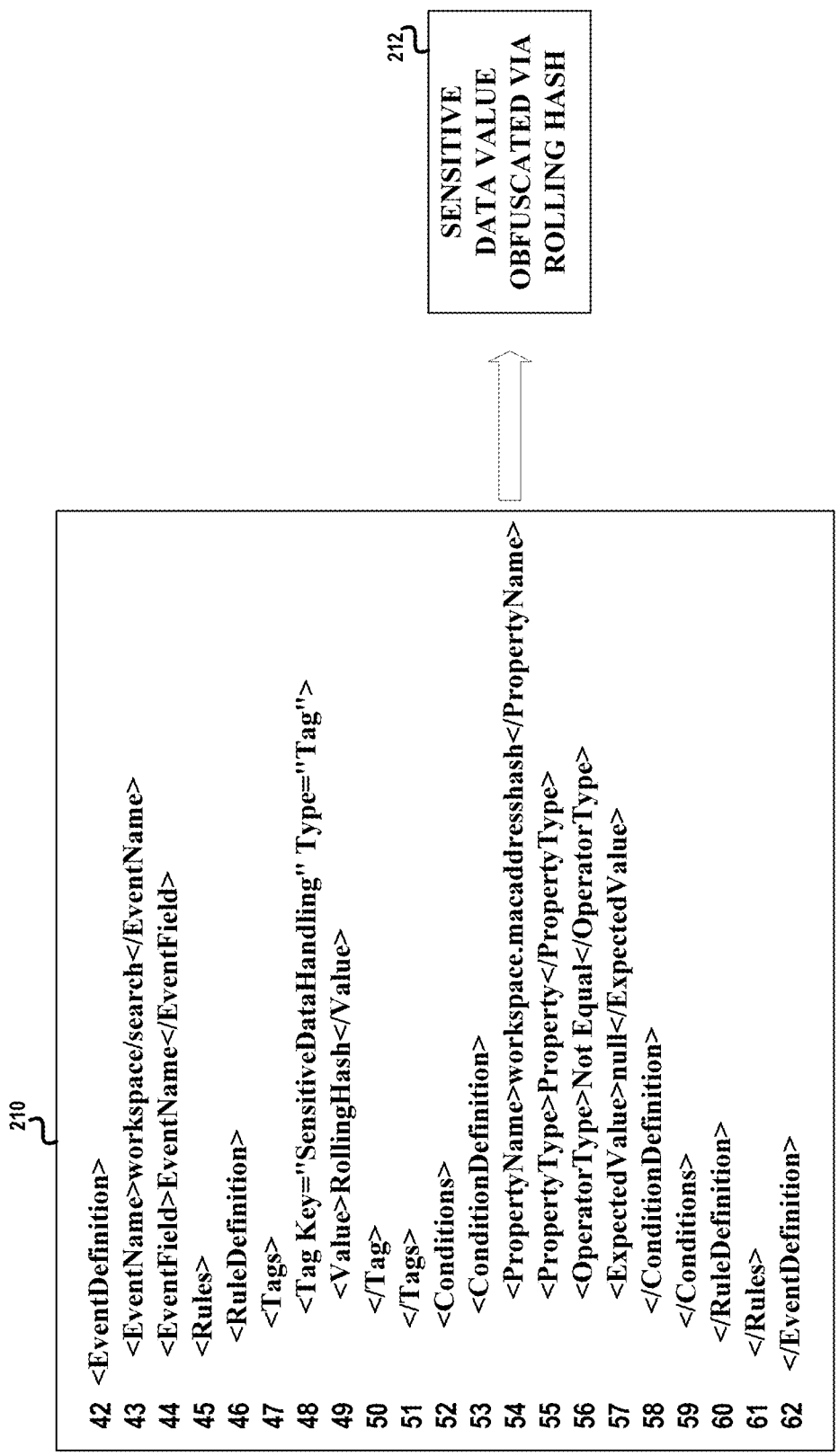

FIG. 2C represents exemplary rules 210 that indicates that a rolling hash is to be applied to a MAC address hash in a document. A MAC address is a medium access control address which represents a unique identifier assigned to a network interface controller (NIC). A MAC address hash is the hash value resulting from application of a hash algorithm to a MAC address.

Lines 42-62 define the event definition. Line 43 defines the event name as workspace/search. Line 44 defines the event field that the rules are applied to, EventName. The rules are composed of tags, lines 47-51 and conditions, lines 52-59. The tag key at line 48 defines the type of the tag which in this example is SensitiveDataHandling. The tag key value, line 49, that is applied to the tag is RollingHash indicating that the identified sensitive data in the document is to be obfuscated with a rolling hash algorithm. The condition, lines 52-59 identifies that the property in the document, workspace.macaddresshash, is to be tagged when workspace.macaddresshash does not have a null value. The workspace.macaddresshash is obfuscated using a more complicated hash technique and the data scrub module 124 replaces the sensitive data with the hashed value in the document 212.

Figure 2D:
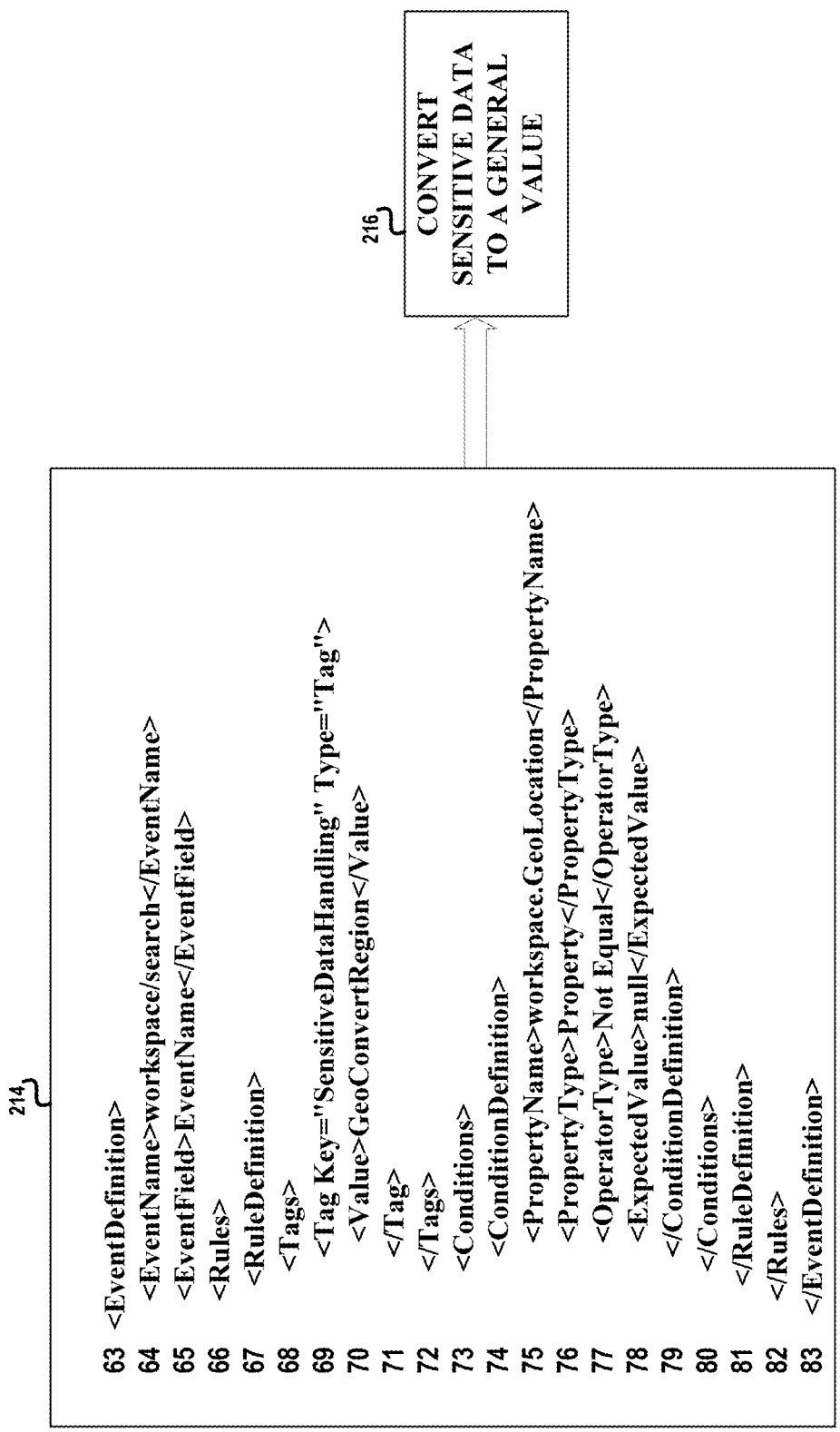

FIG. 2D represents exemplary rules 214 that indicate the transformation of sensitive data into a general or non-sensitive value. In this example, a geolocation in a document is transformed into a general location. A geolocation represents the geographic coordinates of a physical location (e.g., latitude and longitude coordinates). Lines 63-83 define the event definition. Line 64 defines the event name which corresponds to workspaces/search. Line 65 defines the event field that the rules are applied to, EventName. The rules are composed of tags, lines 68-72 and conditions, lines 73-80. The tag key, line 69, defines the type of the tag which in this example is SensitiveDataHandling. The value, line 70, that is applied to the tag is GeoConvertRegion indicating that the identified sensitive data in the document is to be converted to a general location, such as a country and region name. The condition, lines 74-80 identifies that the property in the document, workspace.GeoLocation, is to be tagged when workspace.GeoLocation does not have a null value. The workspace.GeoLocation is transformed into a general location 216.

It should be noted that the GeoLocation tag is not the only conversion-type tag. Another conversion tag is the IPAddress tag which indicates that an IP address is to be converted to the IP service provider's name.

Attention now turns to description of the various exemplary methods that utilize the system and device disclosed herein.

Methods

Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
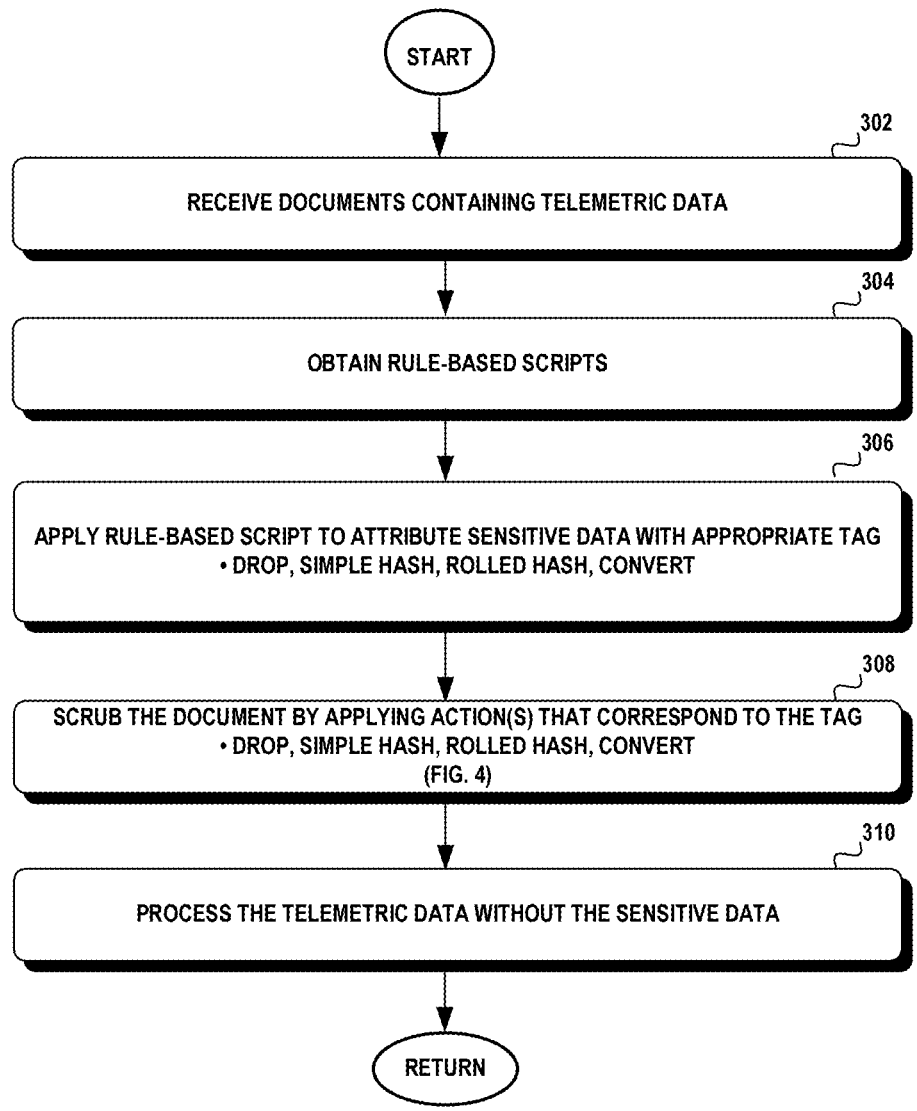
FIG. 3 is a flow diagram illustrating an exemplary method for scrubbing sensitive data from documents using rules.

FIG. 3 illustrates an exemplary method 300 illustrating the manner in which the sensitive data in a document is scrubbed in one aspect. Referring to FIGS. 1 and 3, the attribution module 120 receives the documents 116 that may contain sensitive data (block 302). The documents 116 may be received in batches or individually when sent from a client device 102 (block 302).

The attribution module 120 also receives the rules 118. In one aspect, the rules 118 are implemented in a script file and written in a declarative language (e.g., XML, JSON). The script file may be easily altered to accommodate additional documents that may be formatted with in a different schema and/or accommodate changes to the existing formats. (Collectively, block 304).

The attribution module 120 applies the rule-based script to a document to identify sensitive data and to attribute the sensitive data with an appropriate tag. The tag denotes an action to be applied to a field/property in the document in order to preserve the document for further processing. In the scenario where the sensitive data is personal data, the sensitive data may include a user name, machine name, user id, phone number, mailing address, work address, email address, business title, occupation, geographic location, and/or other data deemed personal. Based on the type of the sensitive data and the rules, the tag denotes a type of action that is to be applied to the sensitive data. (Collectively, block 306).

The tagged document is then processed by the data scrub module 124. The data scrub module 124 transforms the document into a version that can be used by downstream processing. Based on the type of sensitive data contained in the document, the sensitive data may be deleted/dropped, converted into a non-sensitive format, and/or hashed through a simple hashing technique or a rolled hashing technique. (Collectively, block 308). Once the documents are tagged, the telemetric data is processed without the sensitive data (block 310).

Figure 4:
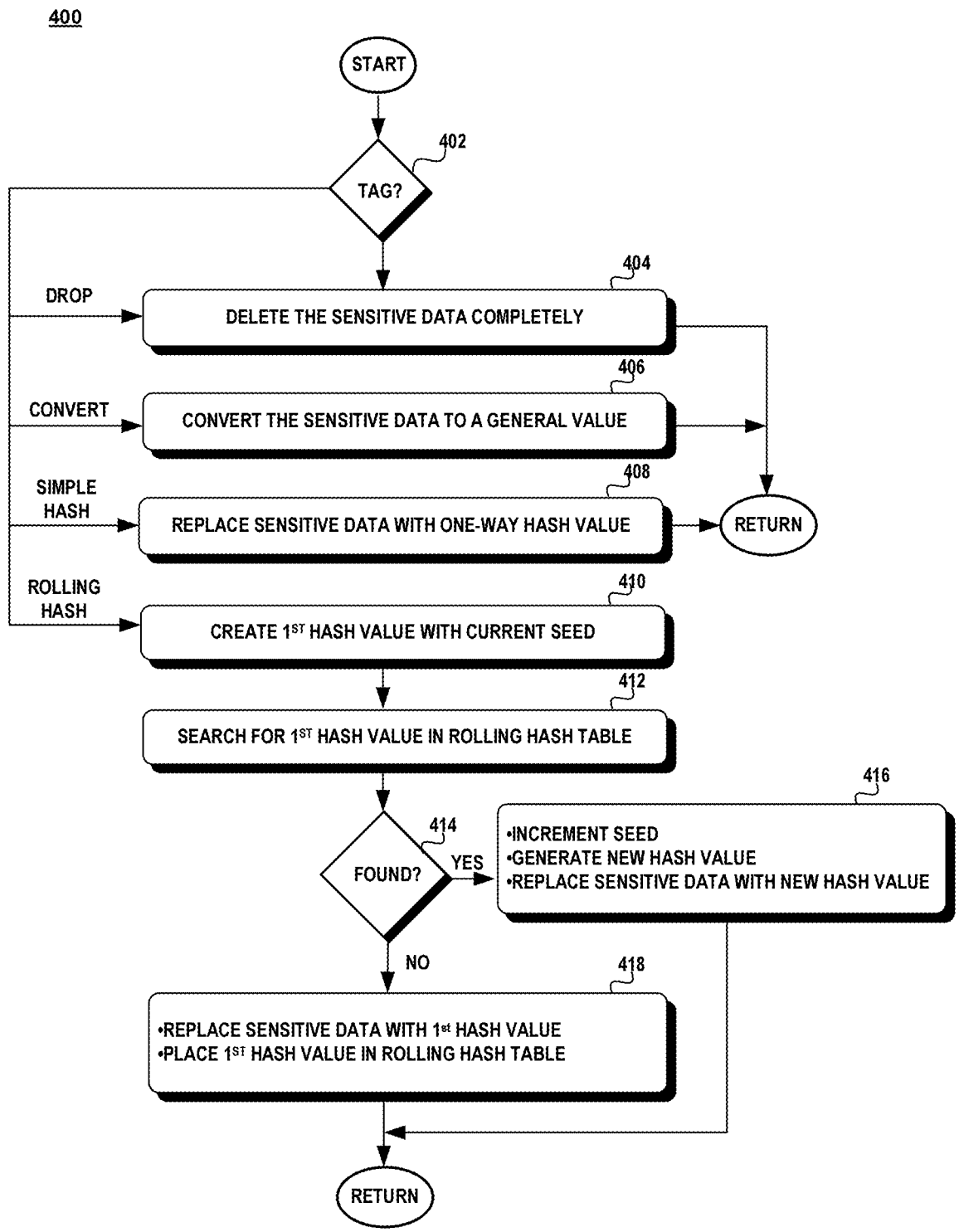
FIG. 4 is a flow diagram illustrating an exemplary method for performing particular actions to scrub sensitive data from a document.

Turning to FIG. 4, there is shown a method 400 for scrubbing sensitive data in a document. The data scrub module 124 reads each tag to determine which scrubbing action to apply to a particular property or field in the document (block 402). When the tag indicates Drop, then the sensitive data is eliminated from the document (block 404). When the tag indicates a Convert, a conversion action, such as GeoConvertRegion, the sensitive data is converted to a more general or non-sensitive value (block 406). In the case of the GeoConvertRegion tag, the geographic coordinates are converted to a country and region location and in the case of IPAddress tag, the IP address is converted to the name of the service provider.

When the tag indicates Simple Hash, the sensitive data is replaced with a one-way hash value. A one-way hash value is generated from application of a hash function without a key. The result is a fixed-length hash value that cannot be reversed (block 408).

For some types of sensitive data, the sensitive data is obfuscated through a more complex hashing technique referred to as a Rolling Hash (blocks 410-418). In the rolling hash technique, the original value of the sensitive data is obfuscated with a hash function and a first-generation seed. The obfuscated value is replaced in the document and the obfuscated value is stored in the rolling hash table. If another document arrives at the telemetric data processing center with the same value for the sensitive data, then another hash value is computed using a different seed. The sensitive data is then obfuscated with the second hash value.

A hash function may be any common hashing function or cryptographic hash function, such as the Message Digest5 (MD5) algorithm, the Secure Hash Algorithm (SHA), and the like. In one aspect, the SHA-256 function is used, with the original value of the sensitive data and a seed. The seed or salt is random data (i.e., randomized value) that is used in a hash function to protect the stored hash value.

Turning back to FIG. 4, when a tag indicates rolling hash for a property, a first obfuscated hash value is created for the value using a hash function and a first-generation seed (block 410). A search is made of the first obfuscated hash value in the rolling hash table (block 412). If the rolling hash table has an entry for the obfuscated value of the sensitive data (block 414—Yes), then the seed is increment, a second obfuscated value is generated and used to replace the value of the sensitive data (block 416). Otherwise, if there is no entry for the obfuscated value of the sensitive data (block 414—No), then the value of the sensitive data is replaced with the first obfuscated value and the first obfuscated value is stored in the rolling hash table (block 418).

Figure 6:
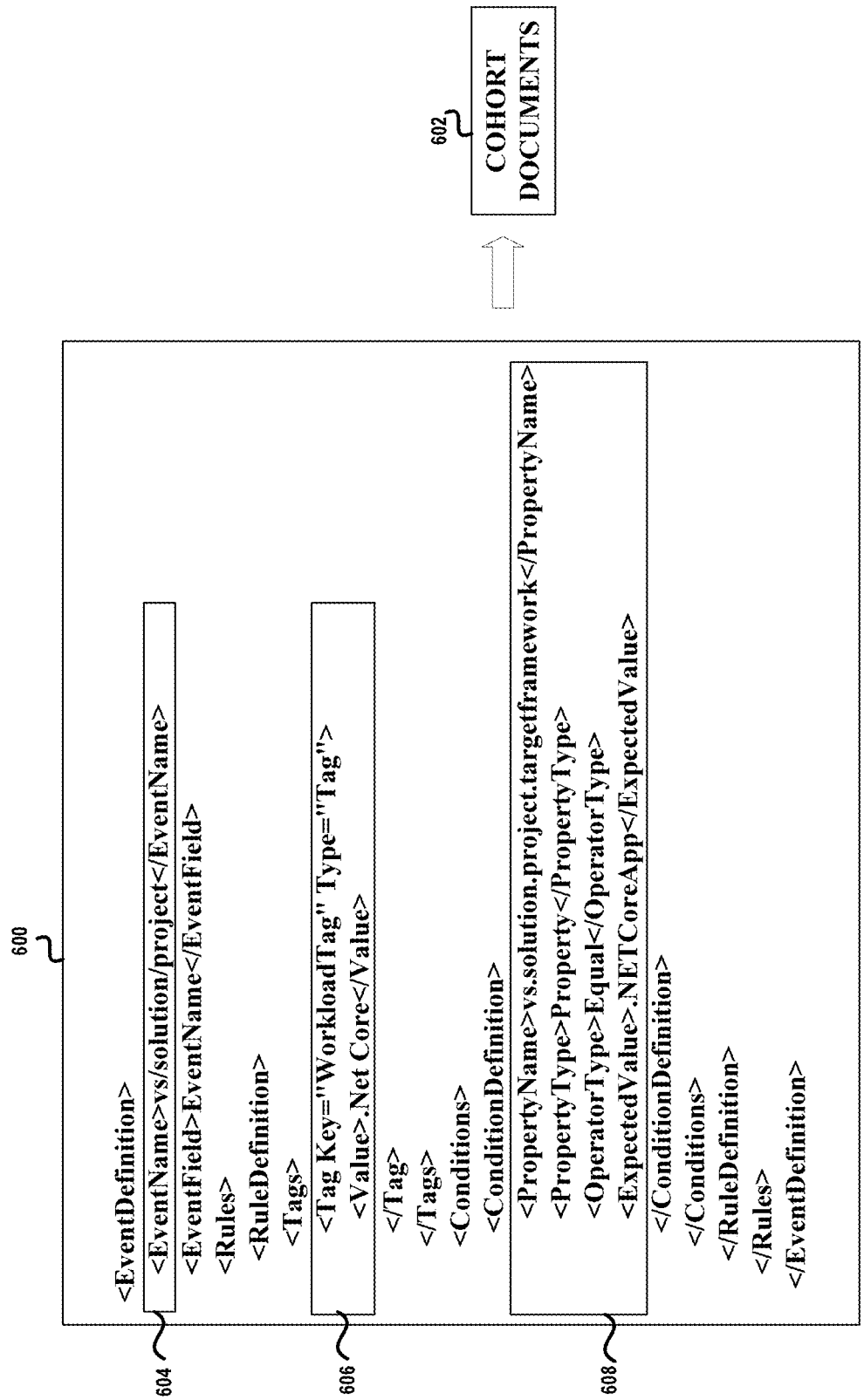
FIG. 6 is a schematic diagram illustrating exemplary rules to cohort users.

The rule-based tagging may be used for other types of processing other than scrubbing personal identifiers or sensitive data. Referring to FIG. 6, there is shown an exemplary rule 600 used to find a cohort or group of users that share a common characteristic 602. In this instance, the rule is used to find event data pertaining to users of .NET Core. .NET Core is an open-source managed computer software framework for Windows, Linux, and Mac operating systems. In this example 600, if a document is named vs/solution/project, 604, and contains a property named vs.solution.project.targetframework, 608, having a value .NETCoreApp, then the document is tagged with .NetCore 606. Documents tagged with the same tag .NetCore may be found and aggregated to study the behavior or characteristics of the anonymous users that belong to this cohort. Similarly, rules may be used to tag a property to find a cohort of anonymous users that are C# developers, Python developers, and so forth.

By way of another example, the tags may be used to homogenize data in documents having different schemas or formats. This is the case when the documents are generated from different products which format their event data differently. The rule-based tagging may be used to align the data in a document so that the data appears the same to downstream processing. Referring to FIG. 7, there are three exemplary rules applicable to three different software products. The rules are used to align the session start events from the different products 700. Rule 702 pertains to an event generated from a first product, rule 704 pertains to an event generated from a second product, and rule 706 pertains to an event generated from a third product.

Rule 702 is applied to an event or document named vs/core/sessionstart 708 which was generated during execution of the first product. The rule tags the document with a SessionStart tag with its value set to True 710. Rule 704 is applied to an event named xs/core/sessionstart 712 which has a property named context.default.xs.core.exename 716 whose value is Studio.app. The boolean value of True is set to the SessionStart tag 714. Rule 706 is applied to an event named context/create 718 which has a property named reserved.contextname 722 whose value is Default. This event has another property named context.default.xs.core.os.productname 724 whose value is macOS. A tag SessionStart is applied to the event with a boolean value of True 720. The rules are used so that information in the event data generated by the three products pertaining to SessionStart are homogenized making them appear to be the same 726.

Exemplary Operating Environment

Figure 5:
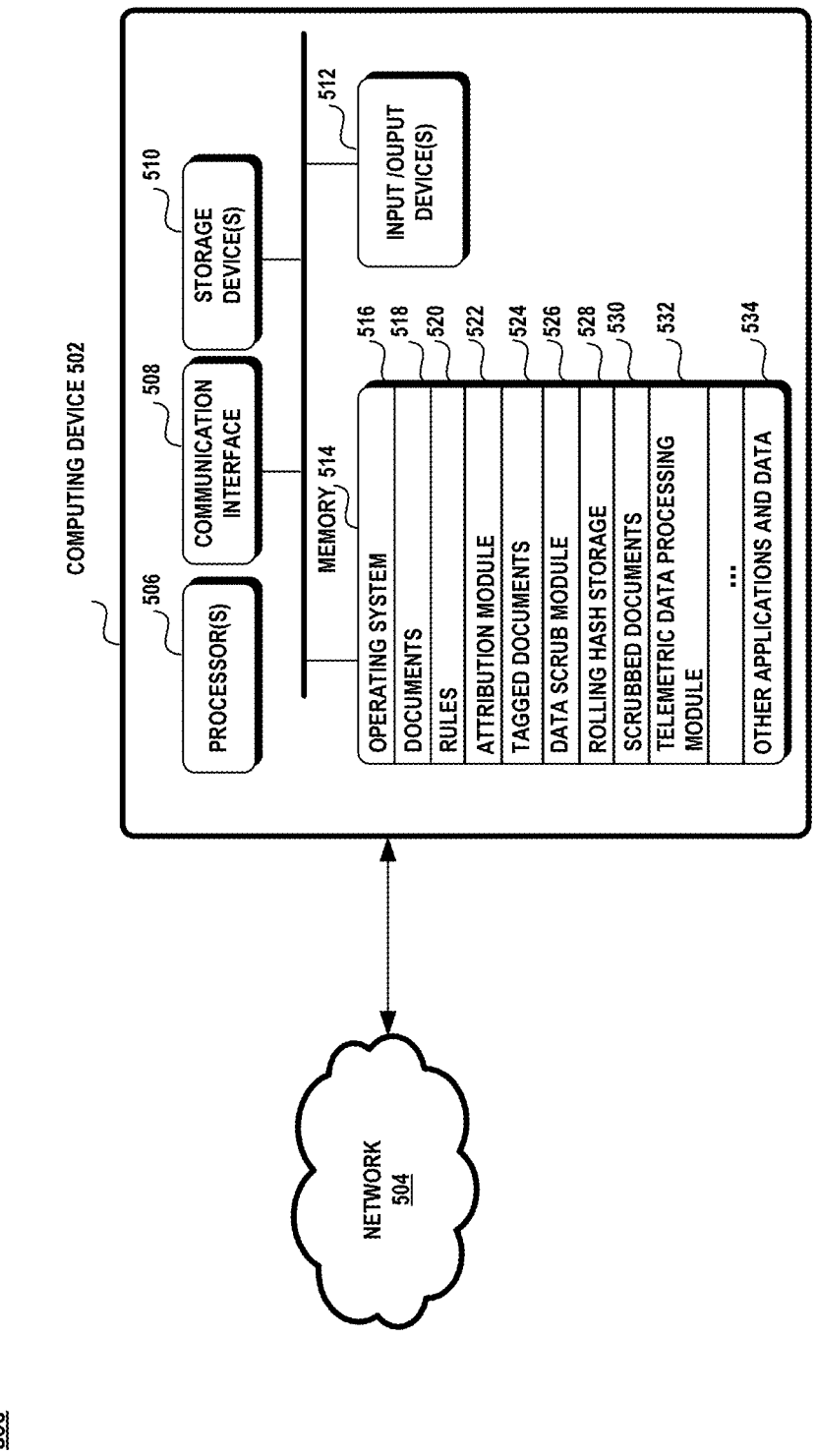
FIG. 5 is a block diagram illustrating an operating environment.

Attention now turns to a discussion of an exemplary operating environment. FIG. 5 illustrates an exemplary operating environment 500 in which a computing device 502 is used to scrub sensitive data in documents containing telemetric data. However, it should be noted that the aspects disclosed herein is not constrained to any particular configuration of devices. The computing device 502 may be configured as part of a cloud service that scrubs documents for sensitive data. It should be noted that the operating environment is not limited to any particular configuration and other configurations are possible.

The computing device 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, IOT device, or combination thereof. The operating environment 500 may be configured in a network environment, a distributed environment, a multi-processor environment, or a stand-alone computing device having access to remote or local storage devices.

The computing device 502 may include one or more processors 506, a communication interface 508, one or more storage devices 510, one or more input/output devices 512, and at least one memory 514. A processor 506 may be any commercially available or customized processor and may include dual microprocessors, quantum computers, and multi-processor architectures. The communication interface 508 facilitates wired or wireless communications between the computing device 502 and other devices. A storage device 510 may be computer-readable medium that does not contain propagating signals, such as modulated data signals transmitted through a carrier wave. Examples of a storage device 510 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 510 in the computing device 502. The input/output devices 512 may include a keyboard, mouse, pen, voice input device, touch input device, display, speakers, printers, camera, etc., and any combination thereof.

A memory 514 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 514 may also include one or more external storage devices or remotely located storage devices that do not pertain to propagated signals, such as modulated data signals transmitted through a carrier wave.

The memory 514 may contain instructions, components, and data. A component is a software program that performs a specific function and is otherwise known as a module, program, and/or application. The memory 514 may include an operating system 516, one or more documents 518, rules 520, an attribution module 522, tagged documents 524, a data scrub module 526, rolling hash storage 528, scrubbed documents 530, a telemetric data processing module 532, other applications and data 534.

The computing device 502 may be communicatively coupled to a network 504. The network 504 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 504 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having one or more processors and a memory. The system has one or more programs, wherein the one or more programs are stored in the memory and configured to be executed by the one or more processors. The one or more programs include instructions that: receive a document including telemetric data and sensitive data; apply one or more rules to the document to identify one or more fields in the document as the sensitive data and to tag at least one identified field in the document with a classification denoted in the one or more rules; based on the tag, scrub the sensitive data from the document; and process the telemetric data without the sensitive data.

The one or more programs include further instructions that: when the classification indicates drop, scrub the sensitive data by deleting the sensitive data from the document; when the classification indicates a conversion, scrub the sensitive data by replacing a value of the sensitive data with a non-sensitive value; when the classification indicates a simple hash, scrub the sensitive data by replacing a value of the sensitive data with a one-way hash value; and when the classification indicates a rolling hash, scrub the sensitive data by replacing the value of the sensitive data with an obfuscated value. The one or more rules are contained in a script file that is applied to the document.

A method is disclosed that includes receiving a current document at a computing device having at least one processor communicatively coupled to a memory, the current document containing telemetric data and sensitive data; applying a tag to the document based on a field in the current document satisfying a rule and condition for being classified as sensitive data; upon the applied tag identifying that the sensitive data was previously replaced in a previous document with a first obfuscated value, replacing the sensitive data in the current document with a second obfuscated value, the first obfuscated value differs from the second obfuscated value; and analyzing the telemetric data without the sensitive data.

The method further comprises: upon the applied tag identifying a field in the document as an identifier associated with a software product, replace the identifier with a one-way hash; upon the applied tag identifying a field in the document as a geolocation, convert the field to a non-sensitive location; upon the applied tag identifying a field in the document as an IP address, convert the field to a name of a service provider; upon the applied tag identifying a field in the document as an email address, remove the email address from the document; upon the applied tag identifying a field in the document as a machine name, remove the machine name from the document; upon the applied tag identifying a field in the document as a project identifier, obfuscate the value of the project identifier with a hashed value; and upon the applied tag identifying a field in the document as a correlation identifier, obfuscate the value of the correlation identifier with a hashed value. The sensitive data that was previously replaced includes a MAC address hash.

A device is disclosed having at least one processor and a memory. The at least one processor is configured to: tag a document with a classification based on a property in the document satisfying a rule and a condition, the document including telemetric data and sensitive data; upon the classification indicating a conversion, convert the sensitive data into a non-sensitive value; upon the classification indicating a simple hash, replace the sensitive data with a hash value from application of a one-way hash function; and analyze the telemetric data without the sensitive data.

The at least one processor is further configured to: upon the classification indicating a rolling hash, replace the sensitive data with a first hash value; and upon receipt of the sensitive data at a later time, replacing the sensitive data with a second hash value. The at least one processor is further configured to: upon the classification indicating drop, deleting the sensitive data from the document. The document is tagged through application of a markup document containing rules. The conversion is applied to a geolocation and a correlation identifier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and a memory;
one or more programs, wherein the one or more programs are stored in the memory and configured to be executed by the one or more processors, the one or more programs include instructions that:
obtain a plurality of documents having telemetric data and sensitive data, a first set of the plurality of documents having a plurality of fields arranged in a first format, a second set of the plurality of documents having a plurality of fields arranged in a second format, wherein the first format and the second format differ;
access a script having a plurality of rules, a rule identifying a select one of the plurality of fields of a select one of the plurality of documents of a specific format as sensitive data and including a scrubbing action;
apply the plurality of rules of the script to each of the plurality of documents to identify sensitive data and to associate a scrubbing action for the identified sensitive data;
tag each of the plurality of documents with a tag indicating the scrubbing action from the application of the plurality of rules;
aggregate select ones of the plurality of documents tagged with a similar tag;
perform a select scrubbing action associated with the similar tag to each of the selected aggregated documents; and
process the telemetric data without the sensitive data.

2. The system of claim 1,
wherein the telemetric data includes an event field that identifies an event that triggered collection of the telemetric data; and
wherein at least one of the plurality of rules identifies the sensitive data based on the event field.

3. The system of claim 1,
wherein the telemetric data includes a condition that specifies circumstances in which the tag is applied; and
wherein at least one of the plurality of rules identifies the sensitive data based on the condition being satisfied.

4. The system of claim 1, wherein the scrubbing action deletes the identified sensitive data.

5. The system of claim 1, wherein the scrubbing action obfuscates the identified sensitive data using a simple hash value.

6. The system of claim 1, wherein the scrubbing action converts the identified sensitive data into a non-sensitive value.

7. The system of claim 1, wherein the scrubbing action obfuscates the identified sensitive data using a rolling hash value.

8. The system of claim 1,
wherein the telemetric data is collected during engagement of a software product.

9. A computer-implemented method, comprising:
accessing a plurality of documents including telemetric data generated from events occurring during execution of one or more software products, wherein the telemetric data includes a plurality of fields, a select one of the fields containing an event triggering collection of the telemetric data;
obtaining a rule-based script having a plurality of rules, a rule identifying sensitive data in at least one field of the plurality of fields of the plurality of documents and a scrubbing action for the identified sensitive data;
applying the rule-based script to each of the plurality of documents to identify fields containing the sensitive data;
tagging select ones of the plurality of documents with a tag based on the applied rule-based script, wherein the tag identifies a scrubbing action;
aggregating the selected ones of the plurality of documents having a common tag;
performing the scrubbing action of the common tag to the sensitive data; and
processing the telemetric data without the scrubbed sensitive data.

10. The computer-implemented method of claim 9, wherein the scrubbing action deletes the identified sensitive data.

11. The computer-implemented method of claim 9, wherein the scrubbing action obfuscates the identified sensitive data using a simple hash value.

12. The computer-implemented method of claim 9, wherein the scrubbing action converts the identified sensitive data into a non-sensitive value.

13. The computer-implemented method of claim 9, wherein the scrubbing action obfuscates the identified sensitive data using a rolling hash value.

14. The computer-implemented method of claim 9, wherein at least one of the plurality of rules identifies the sensitive data based on the event field.

15. The computer-implemented method of claim 9,
wherein at least one of the plurality of rules identifies the sensitive data based on a condition in the telemetric data being satisfied.

* * * * *